(12) United States Patent
Maertens

(10) Patent No.: US 9,181,845 B2
(45) Date of Patent: Nov. 10, 2015

(54) METHOD FOR CALCULATING THE $NO_2$ CONTENT AT THE INLET OF A SELECTIVE REDUCTION CATALYST AND DEVICE FOR THE IMPLEMENTATION OF THIS METHOD

(71) Applicant: Steven Maertens, Toulouse (FR)

(72) Inventor: Steven Maertens, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/381,359

(22) PCT Filed: Feb. 20, 2013

(86) PCT No.: PCT/EP2013/000490
§ 371 (c)(1),
(2) Date: Aug. 27, 2014

(87) PCT Pub. No.: WO2013/127502
PCT Pub. Date: Sep. 6, 2013

(65) Prior Publication Data
US 2015/0020505 A1  Jan. 22, 2015

(30) Foreign Application Priority Data
Feb. 29, 2012 (FR) ...................................... 12 51841

(51) Int. Cl.
*F01N 3/00* (2006.01)
*F01N 11/00* (2006.01)
*F01N 3/20* (2006.01)
*F01N 3/10* (2006.01)
*F01N 3/021* (2006.01)

(52) U.S. Cl.
CPC .............. *F01N 11/007* (2013.01); *F01N 3/208* (2013.01); *F01N 3/2066* (2013.01); *F01N 3/021* (2013.01);

(Continued)

(58) Field of Classification Search
CPC ..... F01N 3/2066; F01N 3/208; F01N 11/007; F01N 3/105; F01N 3/021; F01N 2560/026; F01N 2560/14; F01N 2550/02
USPC .......................................................... 60/274
See application file for complete search history.

(56) References Cited

U.S. PATENT DOCUMENTS

2010/0024390 A1 * 2/2010 Wills et al. ...................... 60/274
2010/0028230 A1   2/2010 Gady et al.

(Continued)

FOREIGN PATENT DOCUMENTS

| EP | 2 143 901 A1 | 1/2010 |
| EP | 2 187 009 A2 | 5/2010 |
| FR | 2 932 217 A1 | 12/2009 |

OTHER PUBLICATIONS

International Search Report, dated May 6, 2013, from corresponding PCT application.

*Primary Examiner* — Jason Shanske
(74) *Attorney, Agent, or Firm* — Young & Thompson

(57) ABSTRACT

A method for the calculation of the $NO_2$ content at the inlet of a selective catalytic reduction—SCR—device (22) of an exhaust system (4) with: an exhaust pipe (10); a tank for a reducing agent and injection elements (18); a first sensor (20) for measuring the concentration of nitrogen oxides upstream of the SCR; and a second sensor (24) for measuring the concentration of nitrogen oxides downstream of the SCR, includes the following stages: halting the injection of reducing agent; measuring the concentration of nitrogen oxides upstream and downstream of the SCR during a period of time; calculating the amount of $NO_2$ accumulated in the SCR during the period of time; and determining the $NO_2$ content upstream of the SCR from the calculated amount of $NO_2$ accumulated per unit of time.

10 Claims, 1 Drawing Sheet

Figure 1:
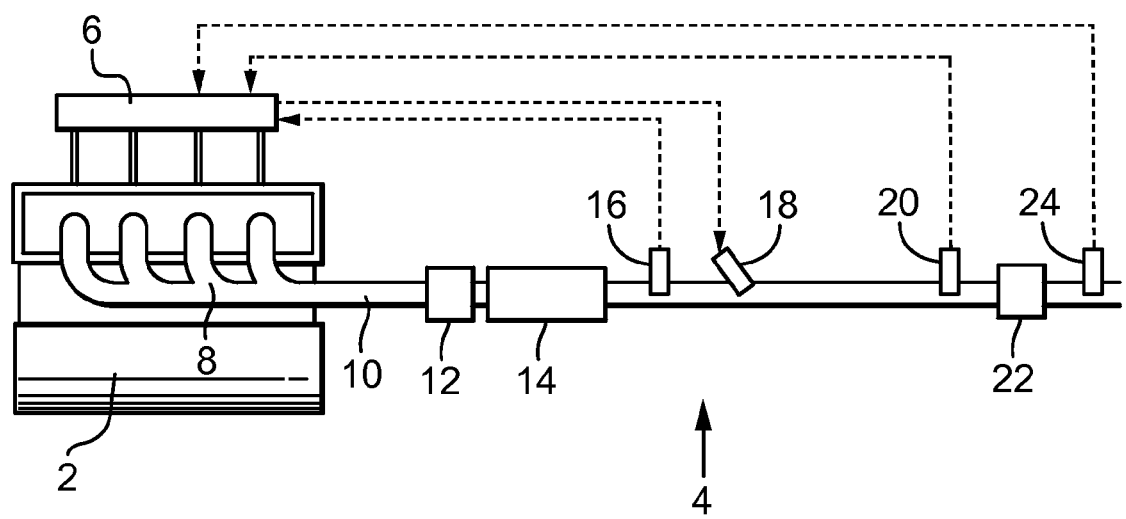

(52) U.S. Cl.
CPC ............ *F01N 3/105* (2013.01); *F01N 2550/02* (2013.01); *F01N 2560/026* (2013.01); *F01N 2560/14* (2013.01); *F01N 2900/0412* (2013.01); *F01N 2900/0418* (2013.01); *F01N 2900/0601* (2013.01); *F01N 2900/1402* (2013.01); *Y02T 10/24* (2013.01)

(56) References Cited

U.S. PATENT DOCUMENTS

2010/0281853 A1    11/2010   Toshioka et al.
2012/0006002 A1    1/2012   Hagimoto et al.

* cited by examiner

METHOD FOR CALCULATING THE NO₂ CONTENT AT THE INLET OF A SELECTIVE REDUCTION CATALYST AND DEVICE FOR THE IMPLEMENTATION OF THIS METHOD

The present invention relates to a method for calculating the $NO_2$ content at the inlet of a selective catalytic reduction device and also a device for the implementation of this method.

The field of application of the present invention is the treatment of the exhaust gases in a motor vehicle and more particularly the reduction of the nitrogen oxides in the exhaust gases. The engines concerned here are essentially engines of diesel type but also controlled ignition engines.

Various means can be employed in an exhaust line of an internal combustion engine (diesel or controlled ignition) in order to limit the amount of pollutant at the outlet of the exhaust line. In the engine itself, there may exist a system for recirculation of the exhaust gases. For example, recirculation of the low-pressure and/or high-pressure exhaust gases, depending on the place where the exhaust gases are withdrawn, may be found.

On the exhaust line proper, one or more of the following devices may be found: oxidation catalytic converter, particle filter and/or selective catalytic reduction device.

The present invention relates to an exhaust line comprising a selective catalytic reduction device. Such a device operates by using ammonia as reducing agent. A tank of ammonia or of a solution comprising ammonia or one of its derivatives is then combined with the exhaust line and an injection device makes it possible to introduce the ammonia or equivalent into the exhaust line upstream of the selective catalytic reduction device. The liquid used to make possible the reduction of the nitrogen oxides can, for example be urea, which is then adsorbed in the selective catalytic reduction device in order to produce ammonia by hydrolysis.

The selective catalytic reduction device, subsequently referred to as SCR (Selective Catalytic Reduction) converter, has an efficiency which corresponds to the content of nitrogen oxide reduced to nitrogen ($N_2$) within said SCR converter.

The efficiency of the SCR converter depends on numerous parameters. It depends, of course, on the amount of ammonia or equivalent introduced into the system. It also depends on the flow rate of the exhaust gases, which directly influences the residence time of the exhaust gases within the SCR converter. The temperature of the exhaust gases also influences the efficiency of the SCR converter.

Nitrogen oxides composed essentially of nitrogen monoxide (NO) and nitrogen dioxide ($NO_2$) are found at the inlet of the SCR converter. The reduction of NO and the reduction of $NO_2$ are not optimum under the same conditions. Thus, the proportion of NO and $NO_2$ in the exhaust gases at the inlet of the SCR converter will also influence the efficiency of the latter.

It is difficult to determine the proportion of the various nitrogen oxides present in the exhaust gases. The sensors currently known make it possible only to determine the content of nitrogen oxides ($NO_x$) present in the exhaust gases. The proportion of $NO_2$ in the exhaust gases can be estimated as a function of the various parameters measured in the engine and relating in particular to the conditions of combustion within the engine. Tables then make it possible to estimate the content of $NO_2$ in the exhaust gases.

The idea at the origin of the present invention is to carry out a calculation in order to estimate the $NO_2$ content at the inlet of an SCR converter so as to be able to better define its efficiency and optimize the latter by adjusting, for example, the amount of ammonia (or urea or other) injected upstream of the SCR converter.

Thus, it is an aim of the present invention thus to provide a method for the determination of the $NO_2$ content at the inlet of a selective catalytic reduction device (SCR converter) and also a device implementing this method, for the purpose in particular of limiting discharges of pollutants at the outlet of such a catalytic device.

Advantageously, the method according to the invention will use only sensors and other devices already present within an engine and its exhaust line in order to carry out the calculation of the $NO_2$ content.

To this end, the present invention provides a method for the calculation of the nitrogen dioxide ($NO_2$) content at the inlet of a selective catalytic reduction device of an exhaust system of an internal combustion engine, said exhaust system comprising:
  a gas exhaust pipe,
  upstream of the selective catalytic reduction device, a tank for a reducing agent and means for injecting the reducing agent into the exhaust pipe,
  a first sensor intended to measure the concentration of nitrogen oxides present in the exhaust pipe upstream of the selective catalytic reduction device, and
  a second sensor intended to measure the concentration of nitrogen oxides present in the exhaust pipe downstream of the selective catalytic reduction device.

According to the present invention, said method comprises the following stages:
  halting the injection of reducing agent into the exhaust pipe,
  measuring the concentration of nitrogen oxides present in the exhaust pipe upstream and downstream of the selective catalytic reduction device during a period of time,
  calculating the amount of nitrogen dioxide ($NO_2$) accumulated in the selective catalytic reduction device during said period of time from the change in the concentration of nitrogen oxides measured upstream and downstream of the selective catalytic reduction device, and
  determining the nitrogen dioxide ($NO_2$) content upstream of the selective catalytic reduction device from the calculated amount of nitrogen dioxide ($NO_2$) accumulated per unit of time.

The present method thus makes it possible to calculate, from time to time, the concentration of nitrogen dioxide ($NO_2$) under predetermined conditions. This calculation makes it possible to know the value of this concentration, which is important for the determination of the efficiency of the selective catalytic reduction device and thus also for the determination of the amount of reducing agent to be injected in order to limit the emission of gaseous pollutants.

In order to obtain more reliable calculation results, it is preferable to implement the method according to the present invention when the corresponding engine is under stabilized operating conditions.

In order to ensure that the selective catalytic reduction device continues to accumulate nitrogen dioxide particles, it is possible to plan for the period of time during which the measurements of concentration of nitrogen oxides for the determination of the content of nitrogen dioxide ($NO_2$) are carried out to be limited so that, at the end of the measurement period, the concentration of nitrogen oxides downstream is less than the concentration of nitrogen oxides upstream.

For the calculation of the amount of nitrogen dioxide ($NO_2$) accumulated and the determination of the nitrogen dioxide ($NO_2$) content, one embodiment of the invention provides for the difference between the concentrations of nitrogen oxides between the upstream and the downstream of the selective catalytic reduction device as a function of the time to be calculated and then for this difference as a function of the time to be integrated in order finally to divide the value obtained by the length of the period of time under consideration. It is assumed here that all the particles, or at the very least most of them, of nitrogen dioxide are stored in the selective catalytic reduction device during the measurement carried out. In this case, depending on the nature of the sensors used to determine the concentration of nitrogen oxides, it may be advisable to apply a correcting coefficient to the measurement results given by the first sensor and the second sensor for the calculation of the amount of nitrogen dioxide ($NO_2$) accumulated. This is because the sensors generally detect both the nitrogen monoxide and the nitrogen dioxide but in a different way, with the result that it is advisable to apply a correcting coefficient to the measurement results in order to obtain a concentration in ppm (or parts per million) of the nitrogen dioxide ($NO_2$) and/or of the nitrogen monoxide (NO).

The present invention also provides a method for managing the pollution control of exhaust gases in an exhaust system provided with a selective catalytic reduction device in which an efficiency of said selective catalytic reduction device is calculated from measured and/or calculated and/or estimated parameters, one of said parameters being a concentration of nitrogen dioxide upstream of the selective catalytic reduction device, notable in that this method provides for the calculation of the content of nitrogen dioxide ($NO_2$) at the inlet of the selective catalytic reduction device by the implementation of a method as described above.

In such a method, it is possible in addition to provide a stage of estimation of the content of nitrogen dioxide ($NO_2$) at the inlet of the selective catalytic reduction device using tables stored in memory, a stage during which the content of nitrogen dioxide ($NO_2$) calculated as provided for above is compared with the content estimated using the tables stored in memory, and a stage in which the values stored in the tables are updated as a function of the content calculated by a calculation method provided for above.

The present invention also relates to a numerical control unit of an internal combustion engine, notable in that it comprises the means necessary for the implementation of each of the stages of a calculation method as provided for above, and also a numerical control unit of an internal combustion engine, notable in that it comprises the means necessary for the implementation of each of the stages of a method for managing a pollution control system as provided for above.

Finally, the present invention also relates to an internal combustion engine, comprising an engine block with combustion chambers and an exhaust system comprising:
a gas exhaust pipe,
upstream of the selective catalytic reduction device, a tank for a reducing agent and means for injecting the reducing agent into the exhaust pipe,
a first sensor intended to measure the concentration of nitrogen oxides present in the exhaust pipe upstream of the selective catalytic reduction device, and
a second sensor intended to measure the concentration of nitrogen oxides present in the exhaust pipe downstream of the selective catalytic reduction device.

Said engine is notable in that it additionally comprises a numerical control unit according to the present invention.

Figure 2:
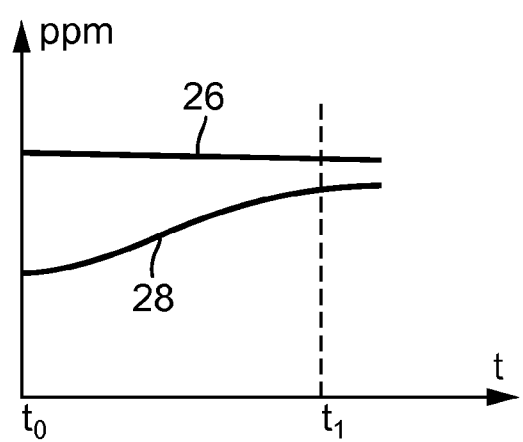

Details and advantages of the present invention will emerge on reading the description which follows of at least one preferred embodiment of the invention, given as nonlimiting illustration, which description is made with reference to the appended schematic drawings, in which:

FIG. 1 diagrammatically illustrates an engine and its exhaust line for the implementation of the present invention, and FIG. 2 represents a graph illustrating the nitrogen oxide contents at the inlet and at the outlet of the selective catalytic reduction device.

FIG. 1 illustrates an internal combustion heat engine comprising an engine block 2 from which an exhaust system 4 extends, said engine being managed by a numerical control unit subsequently referred to as ECU (Engine Control Unit) 6.

The present invention relates more particularly to the exhaust system 4 which has been illustrated in more detail in this FIG. 1. However, the present invention can also apply to an exhaust system exhibiting a catalytic reduction device but a structure different from that represented in the drawing. It can in particular also be applied to exhaust systems with a reduction device in which urea or the like is not stored in liquid form but in solid form, for example in the form of salts. A representation has been given, in FIG. 1 of the drawing, of an exhaust manifold 8 extended by an exhaust pipe 10 on which are fitted, in series, the following components: an oxidation catalytic converter 12, a particle filter 14, a temperature sensor 16, a first $NO_x$ probe 20, an injector 18, an SCR converter 22 and, finally, a second $NO_x$ probe 24.

For reasons of simplicity, a turbocharger or exhaust gas recirculation system has not been represented in the drawing and more particularly in this FIG. 1. In the case of the presence of a turbocharger, a turbine of the latter would find a place on the exhaust pipe 10 upstream of the oxidation catalytic converter 12. Likewise, it is possible to envisage the presence of an exhaust gas recirculation system. Such a system comprises a branch pipe extending from the exhaust system in order to reintroduce a portion of the exhaust gases into the engine block 2. Such an exhaust gas recirculation system is known under the abbreviation EGR system. On one and the same engine, it is possible to have a high-pressure EGR system and/or a low-pressure EGR system according to whether the branch pipe for the exhaust gases is located more or less upstream of the exhaust system.

The oxidation catalytic converter 12 is sometimes referred to as DOC (Diesel Oxidation Catalyst) converter. This DOC converter carries out, in diesel engines, a first treatment of the exhaust gases originating from the engine block 2.

The particle filter 14 is sometimes denoted by the abbreviation DPF (Diesel Particulate Filter). As indicated by this latter name, this particle filter 14 is more particularly intended for engines of diesel type. Just like the oxidation catalytic converter 12, this particle filter 14 is not an essential component for the present invention, which can be applied to exhaust systems not exhibiting such devices.

In the embodiment represented in FIG. 1, the present invention relates more particularly to the SCR converter 22. Such a device is used to reduce the nitrogen oxides present in the exhaust gases. The aim is here to reduce the nitrogen monoxide (NO) and the nitrogen dioxide ($NO_2$) in order to obtain nitrogen ($N_2$) and water ($H_2O$). In order to carry out this reduction, it is necessary to introduce a reducing agent. This agent is generally ammonia ($NH_3$). In practice, a tank containing a urea-based liquid (not represented) is combined with the exhaust system 4. The liquid present in this tank is introduced into the exhaust pipe 10 via the injector 18. The urea present in the injected solution is converted into ammonia by thermolysis and hydrolysis and this ammonia is adsorbed in the SCR converter 22. In order to monitor the pollution control of the exhaust gases in the exhaust pipe 10, the first $NO_x$ probe 20 is found in particular upstream of the SCR converter 22 and the second $NO_x$ probe 24 is found in particular downstream of this converter. Each $NO_x$ probe makes it possible to determine the concentration, for example in ppm (parts per million), of nitrogen oxides present in the exhaust gases occurring in the exhaust pipe 10. The $NO_x$ probes do not make it possible to determine the proportion of NO or the proportion of $NO_2$ among the nitrogen oxide particles detected.

As for any chemical reaction, an equilibrium is established and it is not possible to obtain the conversion of all the nitrogen oxides. An efficiency is then defined for the SCR converter 22 which corresponds to the ratio of the concentration of nitrogen oxide particles downstream of the SCR converter 22 to the concentration of nitrogen oxide particles upstream of the SCR converter 22. This efficiency depends on several parameters. It thus depends in particular on the amount of ammonia (or urea or equivalent) introduced at the inlet of the SCR converter 22 in order to treat the gases circulating in the exhaust pipe 10. This efficiency also depends on the temperature of the exhaust gases and the temperature sensor 16 makes it possible to give the ECU 6 information with regard to this temperature. The flow rate of the exhaust gases, which determines in particular the residence time of the latter in the SCR converter 22, also influences the efficiency of the reduction reaction. Another parameter, as indicated in the preamble to the present patent application, is the proportion of nitrogen dioxide ($NO_2$) among the nitrogen oxides $NO_x$ present in the exhaust gases at the inlet of the SCR converter 22.

The temperature, the flow rate of the exhaust gases and the amount of urea injected are controlled or known parameters but only the amount of urea injected can be acted on in order to vary the efficiency of the SCR converter 22. The $NO_2$ content is generally determined within the ECU 6 using calculation tables or models which, as a function of various parameters measured in the engine, make it possible to estimate the $NO_2$ content present in the exhaust gases, in particular at the inlet of the SCR converter 22. However, during ageing of the engine, the estimated contents can deviate with respect to the contents recorded in the tables. The ageing of the engine is a parameter which can be incorporated for the definition of the tables stored in memory in the ECU 6. However, engines do not all age in the same way and it is preferable to carry out a measurement of the $NO_2$ content rather than rely on the original tables stored in memory in the ECU 6.

The present invention provides for the determination of the content of nitrogen dioxide ($NO_2$) at the inlet of an SCR converter. A procedure in accordance with the present invention in order to determine this content is presented below.

The SCR converter 22 has the ability to store ammonia ($NH_3$) and thus to be more efficient. When the maximum level of loading with ammonia is reached, the excess ammonia is re-encountered at the outlet of the SCR converter 22. When the temperature and/or the flow rate of exhaust gases increase(s), a desorption of the nitrogen dioxide may be observed. A thermal desorption in said converter may then result therefrom. This degree of loading with ammonia is not known, except when it has a value zero.

In addition, the SCR converter 22 can also store nitrogen dioxide ($NO_2$). The idea at the origin of the present invention is then to carry out a measurement under stabilized conditions in order to estimate the amount of $NO_2$ which is stored in the SCR converter 22. In order not to influence the measurement, conditions will preferably be chosen in which the degree of loading of the SCR converter 22 with ammonia is zero. In order to do this, it is advisable to cease the injection of urea or the like before carrying out the measurements necessary in order to estimate the nitrogen dioxide content at the inlet of the SCR converter 22. Under these conditions, if there is no change in equilibrium between the nitrogen monoxide and the nitrogen dioxide between the upstream and the downstream of the SCR converter 22, the same measurement should be seen at the inlet and at the outlet of said SCR converter 22.

However, as indicated above, an $NO_x$ probe is found upstream of the SCR converter 22 and another downstream of the latter. These probes make it possible to determine the total amount of nitrogen oxides in the gas stream but do not make it possible to determine the proportion of one or other of the nitrogen oxides, the overall proportion of which is measured. However, the result of the measurement carried out by an $NO_x$ probe is influenced by the proportion of nitrogen monoxide (NO) and of nitrogen dioxide ($NO_2$) present in the gas stream in which the measurement is carried out. By way simply of illustration, to a first approximation, for a gas stream in which the NO concentration is 50 ppm and the $NO_2$ concentration is 100 ppm, then the $NO_x$ probe will not measure a concentration of 150 ppm (50+100) but a concentration of:

$$50 \text{ ppm} + (0.8) \times 100 \text{ ppm} = 130 \text{ ppm}$$

FIG. 2 illustrates curves for measuring $NO_x$ concentration produced in order to determine the $NO_2$ content at the inlet of the SCR converter 22. As indicated above, these measurements are carried out under stabilized conditions after halting the injection of urea at the injector 18 and when the degree of loading with ammonia of the SCR converter 22 is zero. The upper curve 26 corresponds to the measurement carried out by the first $NO_x$ probe 20 at the inlet of the SCR converter 22. The lower curve 28 corresponds for its part to the measurement carried out by the second $NO_x$ probe at the outlet of the SCR converter 22.

The conditions under which the measurement is carried out being stabilized, it is normal, at the inlet of the SCR converter 22, for the measurement carried out by the first $NO_x$ probe 20 to be constant. At the outlet of the SCR converter 22, the concentration of nitrogen oxides varies as, as mentioned above, nitrogen dioxide is stored within the SCR converter 22. It is noticed that the lower curve 28 tends to return to the upper curve 26. This is because, under stabilized conditions, without injection of urea, reduction no longer takes place within the SCR converter 22. The nitrogen oxides re-entering the SCR converter 22 are thus no longer reduced and emerge unchanged from the SCR converter 22. One and the same measurement is thus encountered at the outlet as at the inlet of said converter when the SCR converter 22 is saturated with $NO_2$.

Due to the absence of reducing agent and in SCR converter 22, the difference in concentration of nitrogen oxides between the upstream and the downstream of the SCR converter 22 corresponds to the storage of the nitrogen dioxide in said converter. By integrating the difference between the upstream concentrations and the downstream concentrations of nitrogen oxides, the amount of nitrogen dioxide ($NO_2$) accumulated in the SCR converter 22 is obtained.

In practice, as illustrated in FIG. 2, a measurement interval beginning at the date t0 and terminating at the date t1 is chosen. The integration of the difference in the concentrations measured downstream and upstream of the SCR converter 22 as a function of the time from t0 to t1 corresponds to the amount of $NO_2$ in the SCR converter 22. In FIG. 2, this amount corresponds to the surface area delimited, on the one hand, by the upper curve 26 and the lower curve 28 and, on the other hand, by the equation straight lines t=t0 and t=t1.

The difference in measurement being related to the variation in the $NO_2$ concentration, it will be advisable, as explained above, to apply a correcting coefficient which, in the numerical example above, has the value 0.8.

By then assuming that, during the transitory period during which the measurement is carried out, the $NO_2$ is stored in the SCR converter 22 and is not discharged downstream in the exhaust pipe 10, it is then possible to determine the mean $NO_2$ content by dividing the value found by the preceding integration by the length of the time interval [t0, t1] of which the measurement was carried out.

Once the measurement has been carried out and the $NO_2$ content estimated, urea or the like can again be injected into the pollution control system of the vehicle concerned.

This one-off measurement of the $NO_2$ content is subsequently used to calibrate the estimations of the $NO_2$ content which are subsequently carried out in order to determine the efficiency of the SCR converter 22 and to optimize as best as possible the amounts of urea (or the like) to be injected at the injector 18 upstream of the SCR converter 22.

This is because the $NO_2$ content at the inlet of an SCR converter influences the efficiency of the latter. The $NO_2$ concentration is estimated using tables which give an $NO_2$ concentration as a function of the various parameters measured in the corresponding engine. It is known to take into account the ageing of the engine and to incorporate this ageing variable in the tables stored in memory within the ECU 6. The measurement carried out makes it possible either to confirm the values obtained using the tables or to correct them. To this end, the value obtained as indicated above is compared with the value obtained from the tables stored in memory in the ECU 6. If a difference in the $NO_2$ content obtained is detected, a degree of correction is then calculated in order to be subsequently applied to the different values which will be obtained using the tables stored in memory.

The present invention thus makes it possible to have a better knowledge of the content of nitrogen dioxide ($NO_2$) at the inlet of a selective catalytic reduction converter. The knowledge of this content is important throughout the life of the corresponding vehicle in order to make it possible to guarantee good pollution control of the latter. The conversion of the nitrogen oxides during a standardized cycle of NEDC (New European Driving Cycle) type is important in order to observe emission standards. According to the standard, the driving cycle begins at an ambient temperature. The engine, including its exhaust system and the various pollution control systems associated with this exhaust system, have to be heated throughout this cycle. In order to obtain a good degree of conversion of the nitrogen oxides, it is important to have a sufficient level of concentration of nitrogen dioxide ($NO_2$) in order to guarantee the efficiency of the selective catalytic reduction converter. It is then important to know the content of nitrogen dioxide throughout the lifetime of the vehicle in order to make it possible to guarantee good pollution control of the latter.

The method provided by the present invention thus makes possible better knowledge of the $NO_2$ content in the exhaust system of an engine. Thus, better pollution control of this engine is possible throughout the lifetime of the latter. The present invention thus provides a more efficient pollution control system and a less polluting engine. One advantage of the present invention is that it can be easily adapted to a current system as it does not require the presence of novel sensors. Its cost price is thus limited.

In the method described above, it was assumed that all the nitrogen dioxide ($NO_2$) is stored in the form of nitrogen dioxide. However, it might also stored in the form of nitrates. In this case, the present invention also applies, as indicated above, but taking into account the conversion into nitrates. This is because this conversion also produces nitrogen monoxide (NO) which will be counted in the measurement carried out by the second $NO_x$ probe 24, downstream of the SCR converter 22. As the stoichiometry of this reaction for conversion into nitrates and nitrogen monoxide is known, it is possible all the same to determine, by the calculation, the content of nitrogen dioxide ($NO_2$).

The invention claimed is:

1. A method for determining nitrogen dioxide content at an inlet of a selective catalytic reduction device of an exhaust system of an internal combustion engine, wherein the exhaust system comprises:
    a gas exhaust pipe,
    a tank for a reducing agent,
    an injector that injects the reducing agent into the exhaust pipe,
    a first sensor that measures a concentration of nitrogen oxides in the exhaust pipe, and
    a second sensor that measures the concentration of nitrogen oxides in the exhaust pipe,
    wherein the tank, injector, and first sensor are located upstream of the selective catalytic reduction device, and the second sensor is located downstream of the selective catalytic reduction device; said method comprising:
    halting an injection of reducing agent into the exhaust pipe,
    measuring the concentration of nitrogen oxides present in the exhaust pipe upstream and downstream of the selective catalytic reduction device during a period of time,
    determining the amount of nitrogen dioxide accumulated in the selective catalytic reduction device during said period of time from the change in the concentration of nitrogen oxides measured upstream and downstream of the selective catalytic reduction device by calculating the difference in concentration of nitrogen oxides between the upstream and the downstream of the selective catalytic reduction device which corresponds to the storage of the nitrogen dioxide in said selective catalytic reduction device, and
    determining the nitrogen dioxide content upstream of the selective catalytic reduction device from the determined amount of nitrogen dioxide accumulated per unit of time.

2. The method as claimed in claim 1, wherein said method is implemented when the corresponding engine is under stabilized operating conditions.

3. The method as claimed in claim 1, wherein the period of time during which the measurements of concentration of nitrogen oxides for the determination of the content of nitrogen dioxide are carried out is limited so that, at the end of the measurement period, the concentration of nitrogen oxides downstream of the selective catalytic reduction device is less than the concentration of nitrogen oxides upstream of the selective catalytic reduction device.

4. The method as claimed in claim 1, wherein said determining the amount of nitrogen dioxide accumulated in the selective catalytic reduction device during said period of time and the determination of the nitrogen dioxide content upstream of the selective catalytic reduction device from the determined amount of nitrogen dioxide accumulated per unit of time are respectively carried out by:

calculating the difference between the concentrations of nitrogen oxides between the upstream and the downstream of the selective catalytic reduction device as a function of the time, and then integrating the difference between the concentrations of nitrogen oxides between the upstream and the downstream of the selective catalytic reduction device as a function of the time, and dividing the integral of the difference between the concentrations of nitrogen oxides between the upstream and the downstream of the selective catalytic reduction device by the length of the period of time under consideration.

5. The method as claimed in claim 4, wherein said determining the amount of nitrogen dioxide accumulated is carried out applying a correcting coefficient to the measurement results given by the first sensor and the second sensor.

6. The method as claimed in claim 1, further comprising calculating an efficiency of said selective catalytic reduction device from measured and/or calculated and/or estimated parameters, wherein one of said parameters is a concentration of nitrogen dioxide upstream of the selective catalytic reduction device.

7. The method as claimed in claim 6, further comprising:
estimating the content of nitrogen dioxide at the inlet of the selective catalytic reduction device using tables stored in memory, comparing the content of nitrogen dioxide determined with the content estimated using the tables stored in memory, and updating the values stored in memory in the tables are as a function of the content determined.

8. The method as claimed in claim 2, wherein the period of time during which the measurements of concentration of nitrogen oxides for the determination of the content of nitrogen dioxide are carried out is limited so that, at the end of the measurement period, the concentration of nitrogen oxides downstream of the selective catalytic reduction device is less than the concentration of nitrogen oxides upstream of the selective catalytic reduction device.

9. The method as claimed in claim 2, wherein said determining the amount of nitrogen dioxide accumulated in the selective catalytic reduction device during said period of time and the determination of the nitrogen dioxide content upstream of the selective catalytic reduction device from the determined amount of nitrogen dioxide accumulated per unit of time are respectively carried out by:

calculating the difference between the concentrations of nitrogen oxides between the upstream and the downstream of the selective catalytic reduction device as a function of the time, and then integrating the difference between the concentrations of nitrogen oxides between the upstream and the downstream of the selective catalytic reduction device as a function of the time, and dividing the integral of the difference between the concentrations of nitrogen oxides between the upstream and the downstream of the selective catalytic reduction device by the length of the period of time under consideration.

10. The method as claimed in claim 3, wherein said determining the amount of nitrogen dioxide accumulated in the selective catalytic reduction device during said period of time and the determination of the nitrogen dioxide content upstream of the selective catalytic reduction device from the determined amount of nitrogen dioxide accumulated per unit of time are respectively carried out by:

calculating the difference between the concentrations of nitrogen oxides between the upstream and the downstream of the selective catalytic reduction device as a function of the time, and then integrating the difference between the concentrations of nitrogen oxides between the upstream and the downstream of the selective catalytic reduction device as a function of the time, and dividing the integral of the difference between the concentrations of nitrogen oxides between the upstream and the downstream of the selective catalytic reduction device by the length of the period of time under consideration.

* * * * *